No. 693,151. Patented Feb. 11, 1902.
R. B. PRICE.
PROCESS OF RECLAIMING RUBBER FROM VULCANIZED RUBBER WASTE.
(Application filed Apr. 11, 1901.)
(No Model.)

Witnesses:
E. F. Wilson
John S. navhook

Inventor:
Raymond B. Price
By Rudolph
Attorney

UNITED STATES PATENT OFFICE.

RAYMOND B. PRICE, OF CHICAGO, ILLINOIS.

PROCESS OF RECLAIMING RUBBER FROM VULCANIZED-RUBBER WASTE.

SPECIFICATION forming part of Letters Patent No. 693,151, dated February 11, 1902.

Application filed April 11, 1901. Serial No. 55,374. (No specimens.)

*To all whom it may concern:*

Be it known that I, RAYMOND B. PRICE, a citizen of the United States, residing at Chicago, in the county of Cook and State of Illinois, have invented certain new and useful Improvements in Processes of Reclaiming Rubber from Vulcanized-Rubber Waste; and I do hereby declare the following to be a full, clear, and exact description of the invention, such as will enable others skilled in the art to which it appertains to make and use the same.

My invention relates to a novel process for reclaiming rubber from vulcanized-rubber waste, the object being to provide a simple and efficient process of this character; and it consists in the novel steps hereinafter fully described and claimed.

Figure 1:
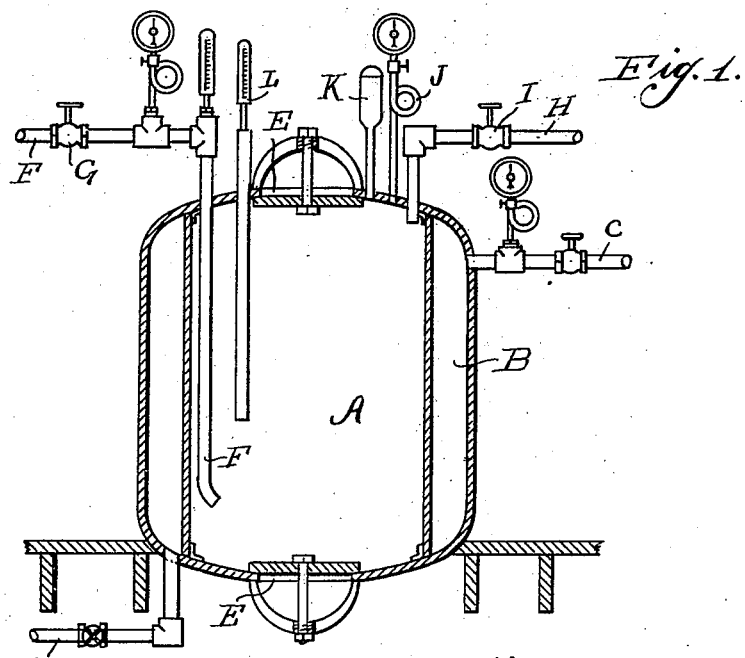
Figure 2:
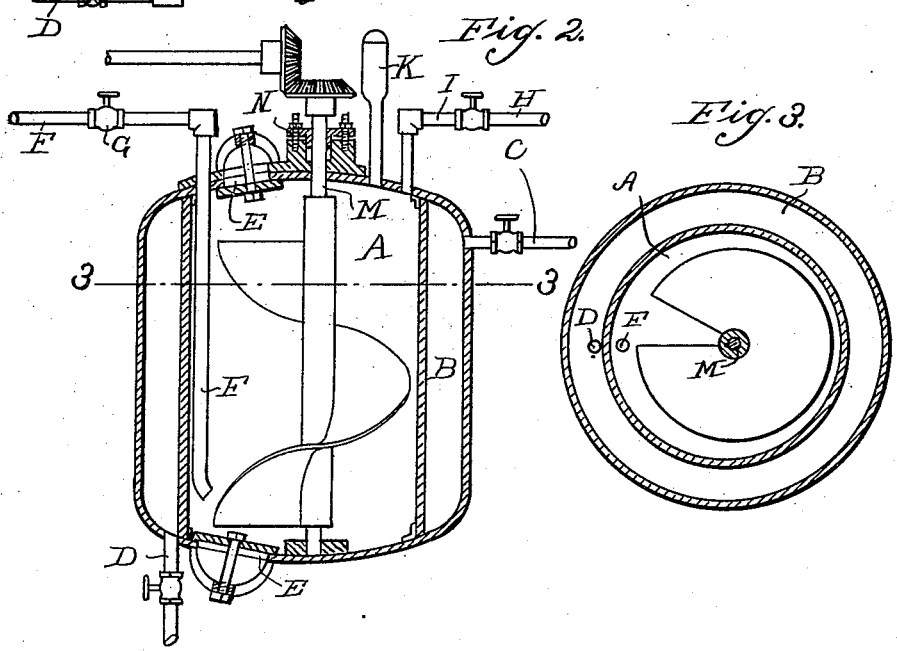
Figure 3:
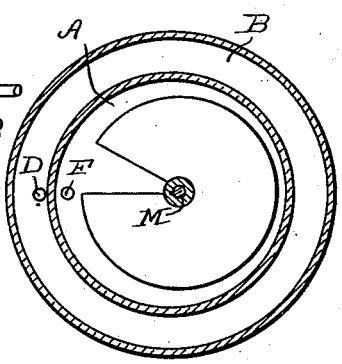

In the accompanying drawings, illustrating apparatus for carrying out my process, Figure 1 is a vertical longitudinal section of an apparatus suitable for my purpose. Fig. 2 is a similar section showing another form of apparatus. Fig. 3 is a horizontal section on the line 3 3 of Fig. 2.

It is a well-known fact that chemical affinities are more pronounced where liquids and gases are concerned than is the case with dry solids. It is also known that in the majority of cases heat is absorbed in reaction resulting from such chemical affinities, and before a reaction can take place the requisite heat must be supplied. Every definite reaction causes either the absorption or release of a definite number of heat units. External conditions—such, for instance, as pressure—have a definite relation to every reaction. The change of physical state as a result of reaction also has a relation to external conditions and must be considered.

It has long been the custom to reclaim vulcanized-rubber waste by subjecting it to steam at a pressure generally of one hundred to one hundred and twenty-five pounds for a period of twenty to thirty hours. The result is a change in the chemical constitution of some of the fillers composing the rubber compound and a softening of the rubber itself. Should heat be applied to the rubber in the open air or with ready access of oxygen, a further vulcanization instead of a softening effect is produced. The higher the steam-pressure used the greater will be the devulcanizing action, owing not to the pressure of the steam, but to its correspondingly high temperature. There is a practical limit beyond which it is both expensive and unsafe to construct devulcanizing vessels.

The object of my invention is therefore to provide a means for providing a high temperature without its corresponding dangerous and unpractical pressure. To this end I employ a superheated fluid, which serves to fill the vessel and exclude oxygen, at the same time furnishing sufficient pressure to insure permeation of the entire rubber mass, and yet at a pressure which can be safely handled in large vessels.

It is possible to accelerate the softening and reaction effects by the employment of a primary or an auxiliary fluid or vapor which by chemical or physical action will assist the metathesis.

My process consists, essentially, in first grinding or finely dividing the rubber waste and placing the same in a vessel in which a given pressure may be maintained and subjecting such waste to the direct action of a superheated fluid, such as steam or other vapors. The action of such superheated fluid may be made more uniform on the entire mass by stirring or agitating the latter. By the use of vapor superheated before its admission in the vessel the temperature of the entire mass can be regulated very nicely, whereas the direct application of heat to the vessel by means of an open fire makes regulation of temperature within certain limits almost impossible. As it is particularly desirable that the temperature of the entire mass should at no time exceed 450° Fahrenheit, but should be maintained at 300° to 450°, according to the material to be treated, the necessity of absolute control will be apparent. The waste may be introduced in a dry or partially moist state or may be entirely immersed in any desired liquid. The use of a bath containing chemicals having affinity for sulfur or acting upon the sulfur to separate same from the rubber is preferable, but not absolutely essential. A number of chemicals could be used for the purpose—as, for instance, five to twenty per cent. solution of hyposulfite of soda. Where a liquid bath is used, the superheated fluid is introduced below the surface and preferably near the bottom of the bath, so as to cause such fluid to bubble up through and thoroughly agitate the liquid, at the same time heating the latter and bringing such superheated fluid in contact with every particle of waste, thereby concentrating its action. I prefer to use a bath in which to immerse the waste which has a higher boiling-point than water, whereby I am enabled more readily to maintain such high temperature at low pressure.. The superheated steam carries relatively so much heat that it does not appreciably dilute the bath, thus maintaining the strength of the latter throughout the process.

The apparatus used for carrying out my process consists of a vessel A, preferably provided with a jacket B to prevent radiation, and into which an attemperating fluid may be introduced by means of the pipes C and D to accelerate or regulate the heating of the contents of said vessel A. The said vessel A is provided at top and bottom with manholes E to introduce and remove the material. A pipe F, provided with a valve G, connects said vessel A near the bottom of the latter with a source of supply of superheated steam or other fluid. An exhaust-pipe H, provided with a valve I, leads from the top of vessel A. A pressure-gage J, safety-valve K, and thermometer or pyrometer L are also provided on said vessel A to enable the operator to maintain a constant pressure and temperature within said vessel.

In Figs. 2 and 3 I have illustrated a similar apparatus provided with a vertical shaft M, entering through a stuffing-box N at top of vessel A and carrying a spiral conveyer or other suitable devices for stirring and agitating the contents of said vessel. Said shaft M is geared to a source of power in any suitable manner.

I claim as my invention—

1. The process for reclaiming rubber from vulcanized-rubber waste, which consists in placing the finely-divided waste in a vessel and subjecting it to the direct action of a previously-superheated fluid other than air in the presence of maintained pressure.

2. The process for reclaiming rubber from vulcanized-rubber waste, which consists in placing the finely-divided waste in a vessel and subjecting it to the direct action of a previously-superheated fluid other than air in the presence of maintained pressure and agitating the mass while subjected to such action.

3. The process for reclaiming rubber from vulcanized-rubber waste, which consists in immersing the finely-divided waste in a liquid and subjecting said liquid to the direct action of a previously-superheated fluid in the presence of maintained pressure.

4. The process for reclaiming rubber from vulcanized-rubber waste, which consists in immersing the finely-divided waste in a bath containing matter acting to separate the sulfur from the rubber, and subjecting such bath to the direct action of a previously-superheated fluid in the presence of maintained pressure.

In testimony whereof I affix my signature in presence of two witnesses.

RAYMOND B. PRICE.

Witnesses:
RUDOLPH WM. LOTZ,
E. F. WILSON.